(12) United States Patent
Datar et al.

(10) Patent No.: US 8,538,989 B1
(45) Date of Patent: Sep. 17, 2013

(54) ASSIGNING WEIGHTS TO PARTS OF A DOCUMENT

(75) Inventors: Mayur Datar, Santa Clara, CA (US); Kedar Dhamdhere, Sunnyvale, CA (US); Ashutosh Garg, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 971 days.

(21) Appl. No.: 12/028,382

(22) Filed: Feb. 8, 2008

(51) Int. Cl.
*G06F 17/30* (2006.01)
*G06F 7/00* (2006.01)

(52) U.S. Cl.
USPC .......................................... 707/780; 707/803

(58) Field of Classification Search
USPC .......................................... 707/999.005, 780
See application file for complete search history.

(56) References Cited

U.S. PATENT DOCUMENTS

| | | | |
|---|---|---|---|
| 7,343,374 B2* | 3/2008 | Berkhin | 1/1 |
| 2003/0182262 A1* | 9/2003 | Yamamoto et al. | 707/1 |
| 2005/0050029 A1* | 3/2005 | Suzuki | 707/3 |
| 2005/0175245 A1* | 8/2005 | Sutanto et al. | 382/229 |
| 2006/0095430 A1* | 5/2006 | Zeng et al. | 707/7 |
| 2007/0027671 A1* | 2/2007 | Kanawa | 704/4 |
| 2009/0199089 A1* | 8/2009 | Bulusu et al. | 715/255 |

* cited by examiner

*Primary Examiner* — Kuen Lu
(74) *Attorney, Agent, or Firm* — Fish & Richardson P.C.

(57) ABSTRACT

Methods, systems, and apparatus, including computer program products, for assigning weights to parts of a document. In one aspect, document object is generated for a collection of documents. Weights for the respective portions of the document object model are generated, and a document is ranked in a search engine index, the ranking being based at least in part on the generated weights.

15 Claims, 5 Drawing Sheets

ASSIGNING WEIGHTS TO PARTS OF A DOCUMENT

FIELD

This specification relates to search engine systems.

BACKGROUND

When indexing documents, search engines may assign weights to different parts of the documents for ranking documents identified as satisfying a search query. For example, a search query word that occurs in the title of a document can be given more weight than if the word occurs in another part of a different document. The heavier weighted document can be ranked higher in a list of returned search results.

As is typical, the application of weights to various parts of a document can be performed manually by a user. For example, the user can analyze the formatting in a document (e.g., text sections, font style, author, etc.) to determine an order of importance to each part of the document or format of the document. The determined order of importance can be used to assign a particular weight to each section or portion of the document. The weighted documents can then be indexed according to an assigned weight.

SUMMARY

This specification describes a Document Object Model (DOM) that is a platform- and language-neutral interface that will allow programs and scripts to dynamically access and update the content, structure and style of documents. The document can be further processed and the results of that processing can be incorporated back into the presented page. The DOM can represent an Application Programming Interface (API) for Hyper Text Markup Language (HTML), eXtensible Markup Language (XML), or other hypertext electronic documents.

In general, one aspect of the subject matter described in this specification can be embodied in methods that include the actions of generating a document object model from a collection of structured documents, wherein each document has a respective structure, the document object model defines a structure of nodes that fits the structures of the documents, and nodes of the document object model correspond to portions of the documents. The method further includes obtaining data representing queries for the documents, wherein each query includes search terms, identifying the portions of the documents containing the search terms, and assigning node weights to nodes of the document object model based on a number of search terms contained in the portions of the documents that correspond to the nodes of the document object model. The method can further include associating one or more respective portion weights to one or more portions of a first document in the collection of documents, each portion weight for a portion being derived from the weight of the corresponding node of the document object model, and weighting content found in the portions of the first document in calculating a scoring function for the first document according to the portion weights associated with the portions of the first document.

Other embodiments of this aspect include corresponding systems, apparatus, and computer program products.

These and other embodiments can optionally include assigning a higher node weight to the nodes of the document object model if the nodes of the document object model include the search terms contained in the portions of the documents that correspond to the nodes of the document object model and the documents that include the search terms are associated with an impression.

In general, another aspect of the subject matter described in this specification can be embodied in systems that include a data store configured to store documents in a collection. The systems include one or more computers operable to interact with the user interface device and to generate a document object model, wherein portions of the document object model correspond to portions of the documents in the collection. The one or more computers are also operable to generate a document object model from a collection of structured documents, wherein each document has a respective structure, the document object model defines a structure of nodes that fits the structures of the documents, and nodes of the document object model correspond to portions of the documents.

Particular embodiments of the subject matter described in this specification can be implemented so as to realize one or more of the following advantages. Analyzing a document object model to determine the relevance of one or more documents can result in providing a user with a list of semantically relevant search results. The document object model may also be used to decide which parts of the document to index and which parts not to index. Thus, memory space can be conserved in the search index used to retrieve documents.

The details of one or more embodiments of the invention are set forth in the accompanying drawings and the description below. Other features, aspects, and advantages of the invention will be apparent from the description and drawings, and from the claims.

DESCRIPTION OF DRAWINGS

Like reference numbers and designations in the various drawings indicate like elements.

DETAILED DESCRIPTION

Figure 1:
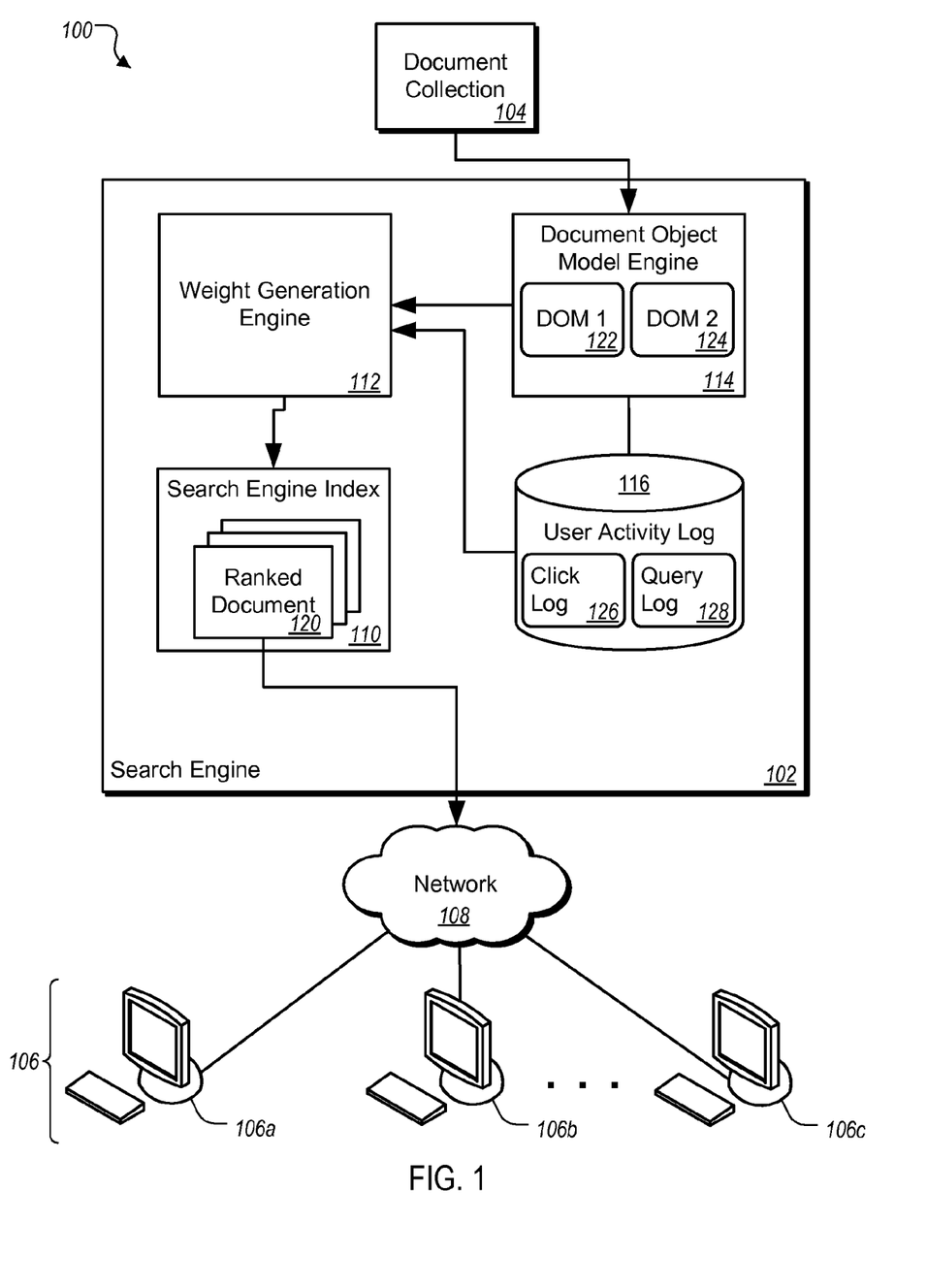
FIG. 1 is a block diagram of an example system for assigning weights in a document object model.

FIG. 1 is a block diagram of an example system 100 for assigning weights in a document object model. A document object model generally represents a hierarchy of nodes in an electronic document (e.g., HTML elements, XML elements, etc.). A DOM node represents a fundamental component of a hypertext electronic document, such as a title, a header, footer, an advertisement, an image, a menu, etc. As described below, the system 100 can generate one or more document object models for a collection of documents. In addition, the system 100 can monitor and/or analyze user activity logs to determine a weighted score for each DOM node in the generated document object models. The weighted score can be used in a process that selects for a user semantically relevant search results in response to a search query submitted by the user.

Weighted scores can be calculated for individual DOM nodes, single web pages, websites, structured documents, and other entities. In some implementations, the weighted score is an aggregation of all the DOM node weights in a webpage.

For example, a user can calculate the weighted score by aggregating a combination of individual DOM node scores in the webpage. The weighted scores can be used to determine whether a particular search result is semantically relevant to a search query. In particular, a search engine can assign weighted scores (e.g., a level of importance) to different nodes of one or more documents. The assigned scores can be used to rank the one or more documents relevant in response to a search query submitted by a user.

The system 100 generally includes components for generating document object models, obtaining query data, generating weights for DOM nodes, associating DOM node weights with document portion weights, ranking documents, and providing the ranked documents to one or more users. In particular, the system 100 includes a search engine 102, a document collection 104, client devices 106a-c, and a network 108. The search engine 102 can be a server system operable to receive one or more documents from the document collection 104, analyze the documents, and provide one or more relevant documents to a plurality of client devices (e.g., users), such as client devices 106a-c, over the network 108.

In some implementations, the search engine 102 receives search queries from a client device 106 and generates relevant search results using a search engine index 110 (e.g., using an index of web pages). Search results can include, for example, lists of web page titles, snippets of text extracted from those web pages, and hypertext links to those web pages, and may be grouped and/or ranked into a predetermined number of search results (e.g., ten). The search results can, for example, be ranked by a quality measure and a relevance measure. For example, a particular web page can have a quality measure derived from the number of other web pages that are linked to the particular web page, and can have an information retrieval score related to how well the query terms match to words in the particular web page. The information retrieval score can be combined with the DOM weight and/or quality measure to give a final rank to the particular web page.

The documents in the document collection 104 can include any number of websites and the web pages associated with those websites. For example, the documents in the document collection 104 include product pages, auction pages, review pages, web logs, or other content accessible using an HTTP protocol. In general, the documents in the collection 104 generally match one type of DOM, although it is possible to combine several document object models within one collection.

In some implementations, the documents in collection 104 include structured documents. In general, a structured document is a defined hierarchy of elements and structure rules. Elements can include a table of contents, an index, chapters, sections, subsections, nodes, and so on. Structure rules can be applied to one or more elements. For example, a structured document can be described as including a table of contents, a series of section headers, sections, subsections, appendices, and an index. A structure rule can dictate which order the above document portions are structured and which elements can be inserted between the existing elements, for example. Furthermore, within each of the sections and subsections, a number of additional structure rules can be defined. For example, one structure rule describes a section as being made up of a chapter title and a preamble followed by a series of subsections.

In some implementations, the structured document is an HTML document. HTML documents can be implemented using any number of structure rules. Structure rules for HTML documents include definitions for which elements can contain other elements. An example of a structure rule can be express how to determine whether one element is contained within another element. For example, one element contains another element if a start-tag and end-tag of the container completely enclose the contained element. Thus, a Head element contains a Title element, and the Title element contains a string of characters.

A large number of documents in the document collection 104 can include similar contents (e.g., a title, a sidebar, an index, advertisements, etc.). In some implementations, the document collection 104 includes the similar content structured in a similar format. The similar content and/or structure can indicate one or more documents in collection 104 are automatically generated by a content provider (e.g., Amazon, eBay, Blogger). Automatically generated documents can generally be laid out using the DOM created for one type of document structure, for example. The system 100 uses the similarity between structured documents to generate a common document object model for one or more documents in the document collection 104. The system 100 analyzes the DOM and any associated user information to determine semantic relevance for one or more received search queries. The system 100 uses the determined semantic relevance to rank search results for the received search queries. The search engine 102 can send the ranked, semantically relevant search results to one or more client devices 106a-c. User information can include preferences, geographical data, click logs, query logs, files, to name a few examples. The user information is generally associated with system use, and in particular search and internet tasks performed by the user.

The client devices 106a-c include any computing device operable to connect or communicate with content search engine 102, or network 108 using any communication link. At a high level, each client device 106a-c may be operable to execute a search engine and includes an electronic computing device operable to receive, transmit, process and store any appropriate data associated with system 100. It will be understood that there may be any number of client devices 106a-c communicably coupled to search engine 102.

As shown in FIG. 1, the search engine 102 includes the search engine index 110, a weight generation engine 112, a document object model engine 114, and a user activity log 116. The search engine index 110 is generally used to extract information about a document (e.g., a webpage in the document collection 104), such as the words the document contains and the location of words in the document. Additionally, the search engine index 110 can extract one or more weights for specific words or document object model elements or sections for comparison purposes. For example, the search engine index 110 extracts weights to determine relevance between a stored entity and a search result based on the DOM node weight. The DOM node weight includes the weight of one particular node in the document such as an image, a table, a title, a heading, etc. In some implementations, the search engine index 110 extracts weights to determine relevance between a stored entity and a search result based on the DOM section weight. The DOM section weight includes the weight of one particular section in the document such as a header section, a footer section, an advertisement section, a body section, etc. In general, sections in a DOM include one or more nodes which contain other nodes. In some implementations, the search engine index 110 extracts weights to determine relevance between a stored entity and a search result based on the word weight within a DOM node or DOM section. The word weight includes a user defined weight for one or more key words or phrases within any node or section in a particular document.

In some implementations, the search engine index 110 can collect, parse, rank, and store the extracted information for later retrieval. For example, the search engine index 110 can store extracted information for natural language documents, video, audio, graphics, and other media included in documents in the document collection 104. In some implementations, one or more indices external to search engine 102 are utilized to collect, parse, rank, or store the extracted information, in addition to the search engine index 110.

In the depicted example, the search engine index 110 includes ranked documents 120. The ranked documents 120 can, for example, include one or more search results produced from a user-entered search query. In some implementations, when a large number of search results exist for a particular query, the search engine 102 ranks the search results using a relevance score. The relevance score may pertain to an activity log, a document object model element, an impression, the location of a term in a website, the date, and so on. For example, the search engine 102 can apply and use a relevance score (e.g., relevant to one or more search query topics) to sort search results such that the pages most likely to be meaningful to the user appear at the top of the ranked list.

In some implementations, the search engine 102 incorporates an inverted index when evaluating a search query. The inverted index can be used to quickly locate documents containing user-entered query terms and rank those documents based on relevance to the query terms. In general, the inverted index stores a list of the documents containing each word. The search engine 102 can retrieve the matching documents quickly using direct access to find the documents associated with each word in the query.

The weight generation engine 112 can generate weights for one or more DOM nodes. More specifically, the weight generation engine 112 can generate weights that correspond to semantic importance of one or more DOM nodes. For example, a search term located in the title node of a particular document can indicate the document includes more semantically relevant information than an advertising node (e.g., an online ad) with the same search term located within the advertisement. As such, the weight generation engine 112 can assign a higher weighting to the title element and a lesser weighting to the advertisement element in a document object model, for example. In general, weight criteria can be determined from a location of the one or more search terms, a format of the one or more search terms, and a frequency count of the one or more search terms within the DOM. In some implementations, links within the documents can carry more weight if the text around the links is concerned with the targeted topic or search term(s).

The weight generation engine 112 can use various weighting mechanisms including, but not limited to linear algorithms, logarithmic algorithms, fuzzy logic, text categorization (TC), term frequency (TF), inverse document frequency (IDF), and inverse word frequency (IWF). Other weighting mechanisms can be used. For example, a weight can be passed from one document to another document through a forward linking relationship. In particular, weights can be generated from a combination of rating or ranking information (e.g., from other users) and one or more links from other documents. The weights for the linking items may in turn be dependent on the links from other items or ranking votes from other users. The passing of weights from one document to another document through forward linking relationships, and the increasing of a weight for a document if it is pointed to by other documents having high weights, is generally exemplified by the well-known Google® PageRank™ system.

The document object model engine 114 can generate document object models for one or more document collections. For example, the DOM engine 114 can analyze the documents in the document collection 104 and build one or more document object models from the content, structure, and style of the documents. Further, the DOM engine 114 can build and associate a DOM with a particular document type. For example, the document object model engine 114 can receive a collection of web pages offering products, such as eBay.com, and can associate the document collection with a first document object model 122. In some implementations, the first document object model 122 includes elements such as a product title, a product description, a product review, a product price, etc., that describe the portions and/or sections of the document. The document object model engine 114 can build other document object models 124 pertaining to other document collection types.

In some implementations, the weight generation engine 112 associates DOM node weights to elements within one or more structured documents in collection 104. For example, each DOM node weight can be determined using the weight given to a particular document element. For example, if a structured document includes the title element as the highest weighted element, the corresponding DOM node "title" can be assigned the highest weighted node in the DOM.

The weight generation engine 112 can also analyze one or more user activity logs 116 to determine actions taken on a document. For example, the weight generation engine 112 can count the number of instances of search terms for each portion of the document. Further, the weight generation engine 112 can determine the user's document or link selection, non-selection, or other action performed on the document.

The user activity logs 116 are stored records corresponding to actions taken on document collection 104. In general, the user activity log 116 includes data representing queries and impressions on document collection 104. In particular, the user activity log 116 is a data store that can, for example, contain data representing queries for structured documents including one or more search terms. For example, the user activity log 116 can store click logs 126 and query logs 128. The click logs 126 and the query logs 128 generally include data related to previous search session queries. Different types of click logs 126 and query logs 128 can be identified. The query logs 128 generally store queries submitted by users. The click logs 126 identify content retrieved in response to the stored queries. In particular, the click logs 126 can be used to identify a number of times content from a particular portion of a DOM node is reviewed (e.g., clicked on or selected) in response to the queries.

The network 108 facilitates wireless or wireline communication between search engine 102 and any local or remote computers including one or more clients 106*a-c*. The network 108 may be all or a portion of a secured network. In another example, the network 108 may be a VPN merely between the search engine 102 and the client 106*a* across a wireline or wireless link. While illustrated as a single or continuous network, the network 108 may be logically divided into various sub-nets or virtual networks without departing from the scope of this specification, so long as at least a portion of the network 108 may facilitate communications between the search engine 102 and at least one client 106*a-c*. In some implementations, the network 108 is a public network (e.g., the Internet).

Turning to the operation of the system 100, the documents in the document collection 104 are retrieved or received by the search engine 102. Next, the search engine 102 extracts the document structure from one or more of the received documents in the document collection 104. For example, the document object model engine 114 can extract the structure and generate a DOM based on the structure of a combination of web pages. In some implementations, several document object models are generated, each corresponding to a different document form. For example, large retail sites such as Amazon.com and Overstock.com automatically architect a large portion of websites (e.g., product pages, auction pages, review pages, etc.) with a similar pattern. The system 100 can use the pattern recognition techniques to generate the DOM 124 corresponding to the document form or structure used in the similar websites.

After one or more document object models are generated, the nodes in the models can be weighted according to importance. The importance may pertain to semantics, formatting, search terms, impressions, document section, statistics, and other factors. In some implementations, the search engine 102 automatically applies weights using the weight generation engine 112. As shown, the weight generation engine 112 can access data from the document object model engine 114 and the user activity log 116 to apply meaningful weights to the document object models 122 and 124. As an example, the search engine 102 can examine the user click log 126 and the user query log 128 to determine the number of times that words from a portion of the document object model 122 have been previously queried and thus, led to a user clicking on a particular document. In some implementations, a system user can intuitively assign weights to the document object model nodes. One such example can include the user 106 assigning a higher weight to a product description or product title than any other node in the DOM.

In some implementations, automatic weight determination and weight adjustment includes processing the user click logs 126 and the query logs 128 to identify statistical search patterns based on the click logs 126 and the query logs 128. A search session can then be compared to the statistical search patterns. Content items responsive to one or more queries of the search session can be identified, and a ranking of the content items is adjusted based on the comparison.

In some implementations, the search engine 102 analyzes anchor text corresponding to a webpage document to determine a weighting. For example, the search engine 102 uses content-based features that generally indicate the structure of the DOM. The content-based features can include aspects of DOM format, such as query matches to anchor text in an HTML page.

After assigning weights to the document object model nodes, the search engine index 110 can extract information about a document, such as the words the document contains and the location of the words, as well as any weight for specific words or sections. The weight can be used in indexing, scoring, or ranking documents for a particular collection of web pages. In some implementations, the search engine index 110 is used to rank documents based on the predetermined weightings of document object model nodes.

At some point, the users 106 can submit a search query to the search engine 102 over the network 108, for example. The query can include one or more search terms, and the search engine 102 can identify and, optionally, rank documents based on document object model element weights. For example, the search engine 102 can count the number of times search terms were found in each section of the document object model 122 based on the search query. Further, the search engine 102 can analyze which sections of the DOM 122 led to more or fewer clicks on documents in the document collection 104. For example, some document object model sections are more likely to be clicked on than other sections. As is the case when comparing a footer section (less clicks) to a title section (more clicks). The likelihood of selecting one document object model section over another can be analyzed by the search engine 102. The analysis can be used to provide an enhanced relevance of search results to the user. For example, the search results analyzed for location in the document can provide search results with semantic relevance, rather than simply matched text or matched formatting.

After the search engine 102 analyzes the document collections relevant to a search query, the search engine index 110 can rank the documents. Various ranking techniques can be used to rank the documents. For example, the search engine index 110 can employ ranking techniques including standard competition ranking, modified competition ranking, dense ranking, ordinal ranking, and fractional ranking. Other ranking algorithms and techniques can be used. In general, the ranked documents 120 can be bundled and presented to the user 106 (e.g., according to the rank).

In some implementations, the search query additionally includes one or more weight criteria which require that the one or more search terms are located in a section selected from a header section, a caption section, an abstract section, a footnote section, a summary section, or a title section. For example, the user may indicate search terms and a condition of finding the term in the summary section of the document. As such, the search engine 102 can weight the summary element as the highest element in the document object model. The search expression may also include one or more weight criteria which require that one or more search terms have a format that is different from a common format of the candidate document. The format may be selected from bold, italic, color, font size and font type. Furthermore, the search expression may include one or more weight criteria which require that a search term be present in the candidate document at least once, more than once, or at least a minimum number of times.

Figure 2:
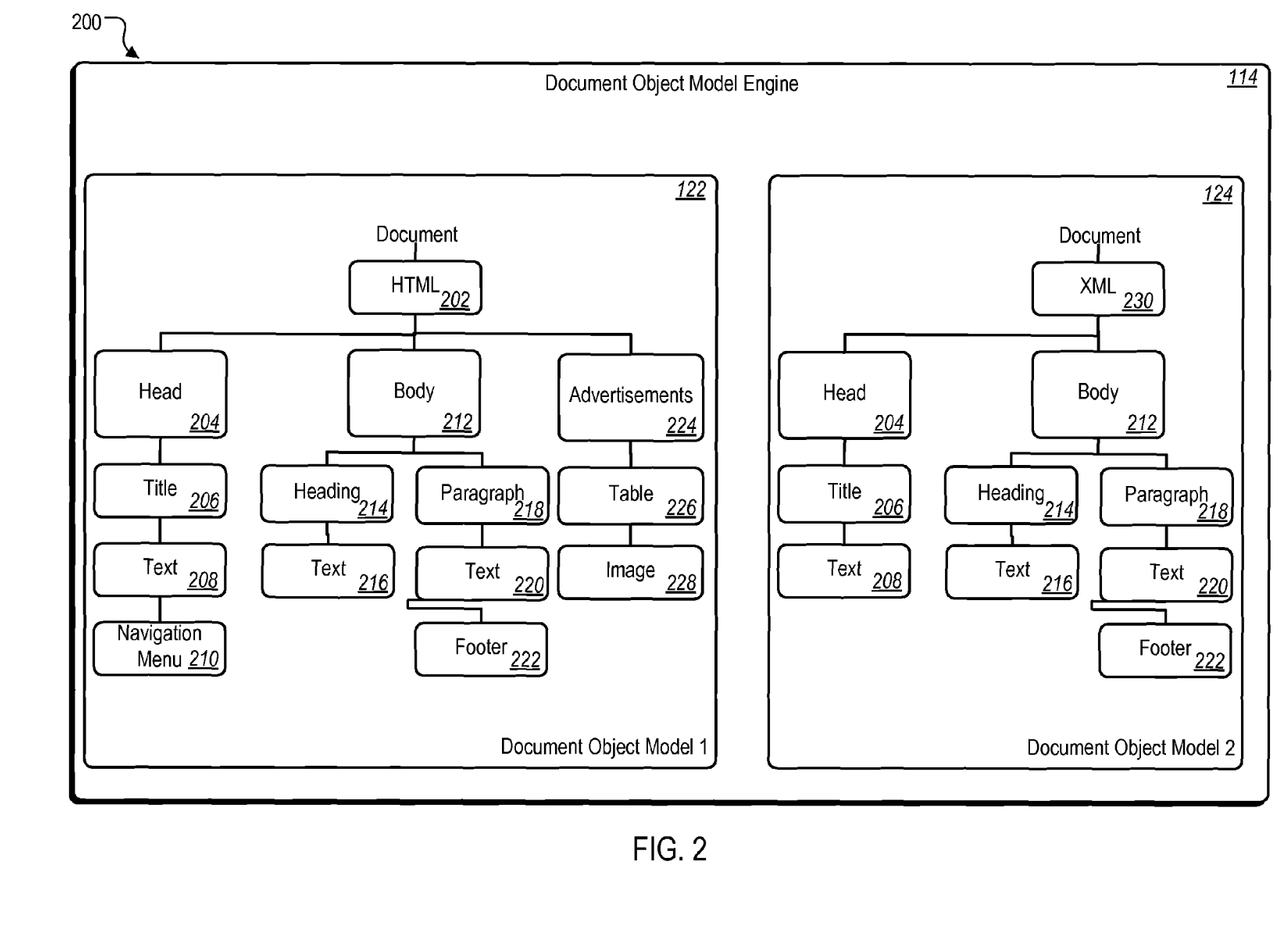
FIG. 2 is a block diagram showing example structures for two document object models.

FIG. 2 is a block diagram showing example structures for two document object models. The structures 200 include a hierarchical tree structure of nodes found in an example HTML document (DOM 122) and an XML document (DOM 124). The document object model engine 114 can use input from the weight generation engine 112 and the user activity log 116 to generate document object models 122 and 124. The document object model engine 114, along with the components in FIG. 1, can be used to rank one or more elements in the document object models 122 and 124. The ranking can be used to determine semantically relevant search results for the user 106, for example.

As shown in FIG. 2, the structure of the DOM 122 includes a document type of HTML 202, an HTML node Head 204, an HTML Head sub-node Title 206, a sub-node Text 208, and a sub-node Navigation Menu 210. The HTML document 202 also includes a node Body 212 with a sub-node Heading 214 and a nested sub-node Text 216. The Body 212 node also includes a Paragraph sub-node 218, a nested sub-node Text 220, and a nested sub-node Footer 222. The HTML document 202 further includes an Advertisements node 224 with sub-nodes Table 226 and Image 228. Other HTML nodes, sub-nodes, attributes, and text are also added to the DOM 122, but are not illustrated in FIG. 2.

The structure of DOM 124 includes a document type of XML 230, an XML node Head 204, an XML Head sub-node Title 206, and a sub-node Text 208. The XML document 230 also includes a node Body 212 with a sub-node Heading 214 and a nested sub-node Text 216. The Body 212 node also includes a Paragraph sub-node 218, a nested sub-node Text 220, and a nested sub-node Footer 222.

The two document object models 122 and 124 include some overlapping nodes. For example, the head node 204 and the body node 212 are included in both models. Since the nodes represent the same sections in two different document types, the nodes may receive the same weighting factor in the weight generation engine 112, for example. In some implementations, the search engine 102 can use pattern recognition techniques to automatically identify nodes that overlap in several document object models. For example, the search engine 102 can classify an unknown document (as it enters the search engine 102) by comparing the document object model nodes (of the unknown document) against document object model nodes stored in the search engine 102. The identified overlap may be used to indicate which document object model the document belongs. For example, the user may assign the document to the document object model that overlaps the majority of the nodes. In some implementations, a document may not fit the previously generated document object models in the search engine 102. In such a case, the document can invoke the search engine 102 to generate a new document object model.

In some implementations, the search engine 102 generates a document object model using common nodes found in several documents in the document collection 104. For example, the document object model generally includes only those sections found in one particular document collection. The document object model can be as simple as a title node, a body node, and a reference node. The simplified document object model can be used by the system 100, for example, to rank search results based on whether the search terms existed in the title, body, or references of each search result.

Figure 3:
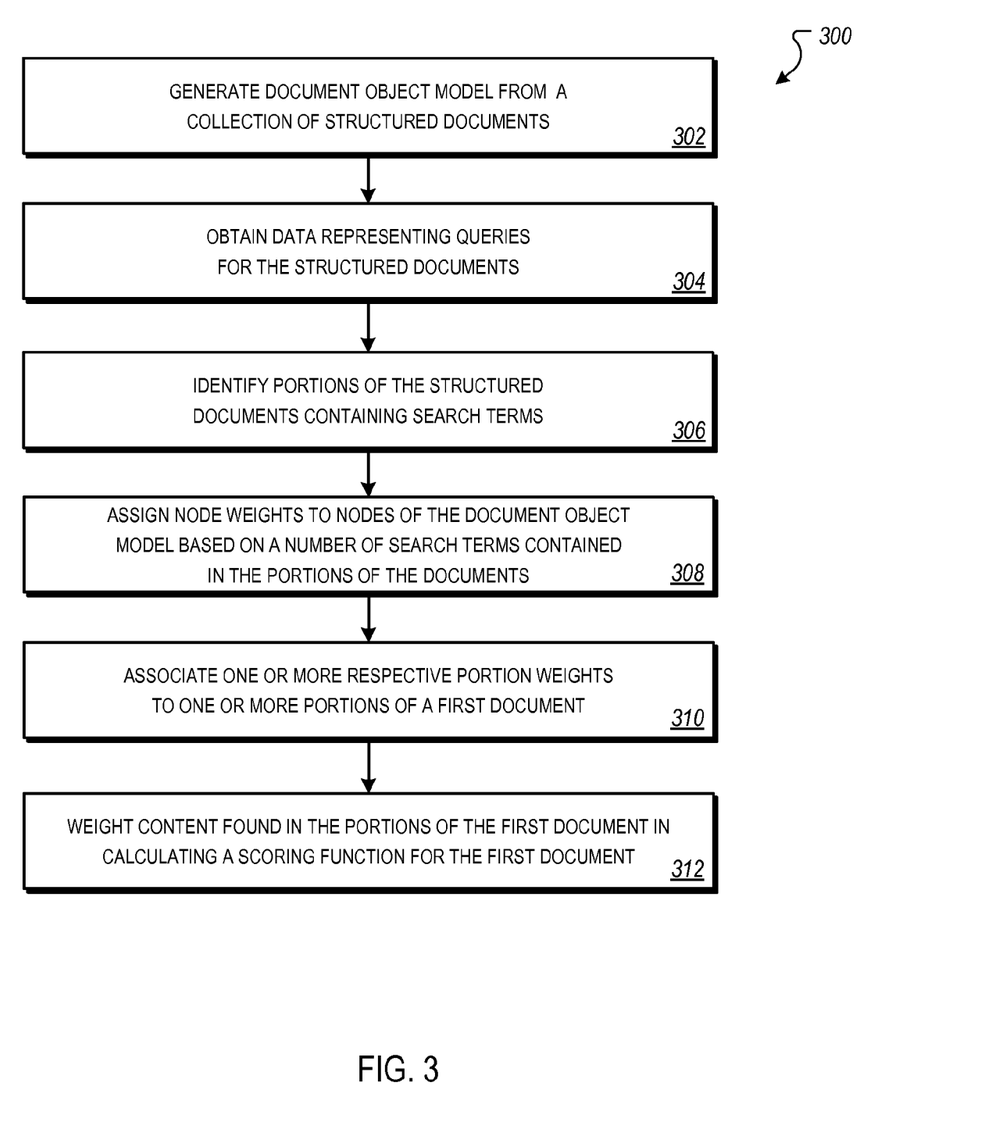
FIG. 3 is a flow diagram of an example process for generating and applying weights to document object model nodes.

FIG. 3 is a flow diagram of an example process 300 for generating and applying weights to document object model nodes. The process 300 can, for example, be performed by the system 100. For illustrative purposes, the process 300 shall be described in reference to the architectures shown in FIG. 1 and FIG. 2; although it should be understood the process 300 can be applied to different architecture configurations other than FIG. 1 or FIG. 2.

The system 100 generates a document object model from a collection of structured documents (302). For example, the search engine 102 generates the DOM 122 based on the content in one or more structured documents. The DOM generally defines a structure of nodes that fits the structures of the documents. Nodes of the DOM 122 correspond to portions of the documents of the document collection 104.

The system 100 obtains data representing queries for the structured documents (304). For example, the search engine 102 obtains query data from the user activity log 116. The query data includes search terms, click logs 126, and query logs 128. The data representing queries can include impressions associated with one or more structured documents. In some implementations, an impression can occur through an action by a user making a selection on a link to the structured document. Selecting the link presents the document to the user for viewing and may add to the impression count for the selected document. In some implementations, an impression can occur if the user enables an automatic setting such as a toolbar to view only portions of a document. For example, if the user enables the toolbar to display the document link, the title, and the abstract, the toolbar can automatically report what portions of the document the user actually chose to display. Other impression logging techniques are possible.

Upon retrieving query data for the structured documents, the system 100 identifies the portions of the structured documents that contain search terms (306). For example, the weight generation engine 112 uses data in the click log 126 and query log 128 to determine where in the document one or more relevant query terms are located. The relevant query terms generally correspond to a user entered query. The weight generation engine 112 also determines if a click activity or an impression activity occurs as a result of the previous user entered query.

The system 100 assigns node weights to nodes of the DOM based on a number of search terms contained in the portions of the documents (308). For example, weights can be assigned to each document object model node, such as the head node 204, the body node 212, the advertisement node 224, or any sub-node below these nodes. Generally, the head node 204 is heavily weighted since it includes the title 206, where the title 206 can provide high semantic relevance to the search query. Similarly, the advertisement node 224 may be lightly weighted since ads rarely have semantic importance in a search query result.

In some implementations, assigning node weights includes assigning weights for a group of nodes, such as assigning a weight for the entire document. The weight generation engine 112 can generate weights for one or more document object model nodes by monitoring the user activity log 116. For example, the search engine 102 can count the number of instances of clicks for respective portions of the document object model by accessing the click log 126 and the query log 128. Further, the search engine 102 can use the count values to apply a weight for one or more portions of the document object model based on the user activity log 116.

In some implementations, the search engine 102 accesses the query log 128 and a snippet of a document that was previously presented in response to the query. Finding an occurrence of one or more search terms within the document snippet invokes the weight generation engine 112 to increase the weight of one or more nodes that include the snippet content (e.g., a search term). In some implementations, the search engine 102 examines the query logs 128 and the snippet that was shown for the document. For example, if a particular word occurs in the snippet, the occurrence can lead to increasing the count for the DOM node with an otherwise small weight.

The system 100 associates one or more respective document portion weights to one or more portions of a first document (310). In particular, the system 100 derives a document portion weight from the weight of a corresponding node of the DOM. For example, if a DOM node (e.g., a title node) is weighted heavily, then the corresponding document portion (e.g., a title) is weighted just as heavily. Further, if a particular search term entered by a user is found in the document title, the system 100 can increase the document portion weight by increasing the weight of the title node in the DOM. For example, if the search term is found in the document, the weight generation engine 112 determines where a search term is located within the document and assigns an added weight to the corresponding DOM node or nodes. In the event that an impression of the document resulted, then a larger weight is added to the corresponding DOM node.

The system 100 weights content found in the portions of the first structured document in calculating a scoring function for the first document (312). In some implementations, the weight generation engine 112 can apply a weight to a DOM node by ranking each node according to a number of instances of clicks that occurred in relation to that node. For example, the search term can appear equally in the title node 206 and the footer node 222. However, the user may click the result based on the title node 206 more often than clicking the result based on the footer node 222. For instance, if the title node includes three hits and the footer node includes one hit, the title node 206 is ranked higher than the footer node 222, in this example. In this fashion, the search engine 102 can apply the greatest weight to the respective part of the document with the highest number of instances of clicks.

Once the weights are generated for the document object model nodes, the documents can be ranked in the search engine 102 based on the generated weights. For example, the search engine 102 can numerically order the documents from highest weight to lowest weight or visa versa. In some implementations, ranking algorithms can be used in addition to the generated weights to determine the presented document order.

Figure 4:
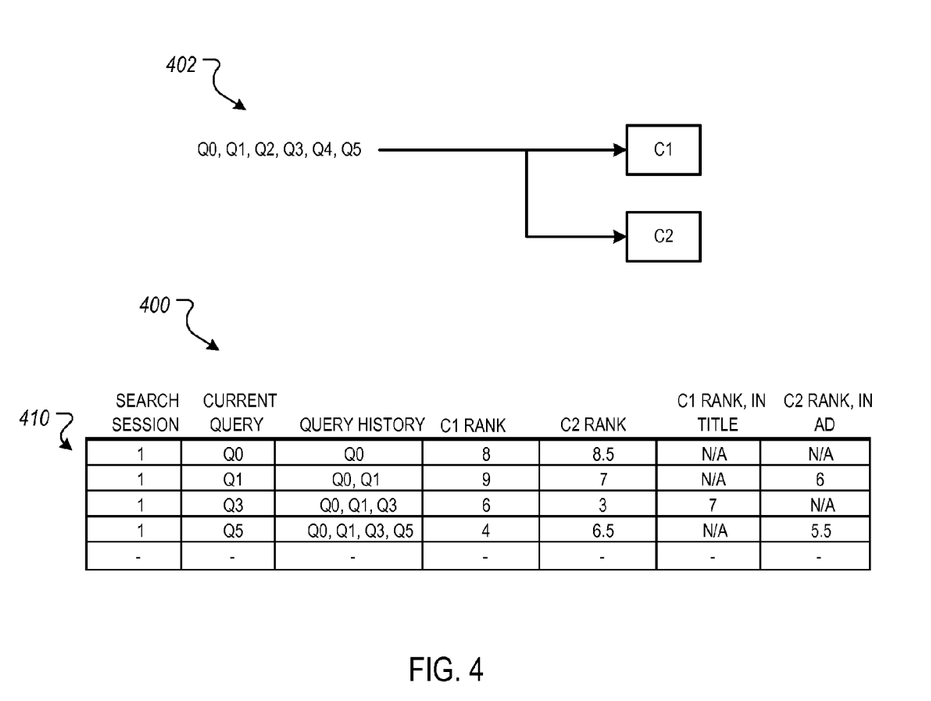
FIG. 4 is an example query and ranking table.

FIG. 4 is an example query and ranking table 400. The techniques applied to the table 400 can be used by the search engine index 110, for example, to generate the ranked search documents 120. The query and ranking table 400 illustrates different ranking adjustments for an example query path 402 defined by the queries Q0, Q1, Q2, Q3, Q4, and Q5 associated with two content items C1 and C2. Each query Q0-Q5 can include one or more user-entered or computer-determined search terms. In some implementations, the query path 402 includes a series of queries in a particular order provided by users.

Ranking adjustments can be applied to increase or decrease the ranking score of a particular search result. The adjustments in this example are based on whether a search term is located within a document object model node. For example, if the search term is located within the title section of a search result, the rank of the result can be increased. Similarly, if the search term is located within an advertisement section in the document, the rank of the search result may be decreased. For simplicity, the scale used in the example 400 ranks search results from 1-10. For example, a higher ranking number is better than a lowered number ranking. Other scaling systems are possible.

As shown in the query and ranking table 400, queries Q0, Q1, Q3, and Q5 are received during a first search session 410. For the first query Q0, the content items C1 and C2 are, for example, respectively ranked 8 and 8.5 in a list of search results for the query Q0. In this query, none of the search terms are found within the title section or the advertisement section. Because the query Q0 search terms are not included in the title node or the advertisement node, the rankings of the content items C1 and C2 are not adjusted.

For the second query Q1, the content items C1 and C2 are, for example, respectively ranked 9 and 7 in a list of search results for the query Q1 where one or more query Q1 search terms exist in the title section for C1 and the advertisement section for C2. Accordingly, the rankings of the content item C1 can be increased to 9 while the content item C2 can be lowered to 7.

For the third query Q3, the content items C1 and C2 are, for example, respectively ranked 6 and 3 in a list of search results for the query Q3 where one or more query Q3 search terms exist in the title section for C1. Accordingly, the rankings of the content items C1 can be adjusted to account for the relevance. For example, the rank of C1 can be increased to 7 since the query Q3 search terms exist in the document title section.

For the fourth query Q5, the content items C1 and C2 are, for example, respectively ranked 4 and 6.5 in a list of search results for the query Q5 where one or more query Q5 search terms exist in the advertisement section for C2. Accordingly, the rankings of the content item C2 can be adjusted to account for a lack of relevance. For example, the rank of C2 can be decreased to 5.5 since the query Q5 search terms exist in a less relevant advertisement section of the document.

Figure 5:
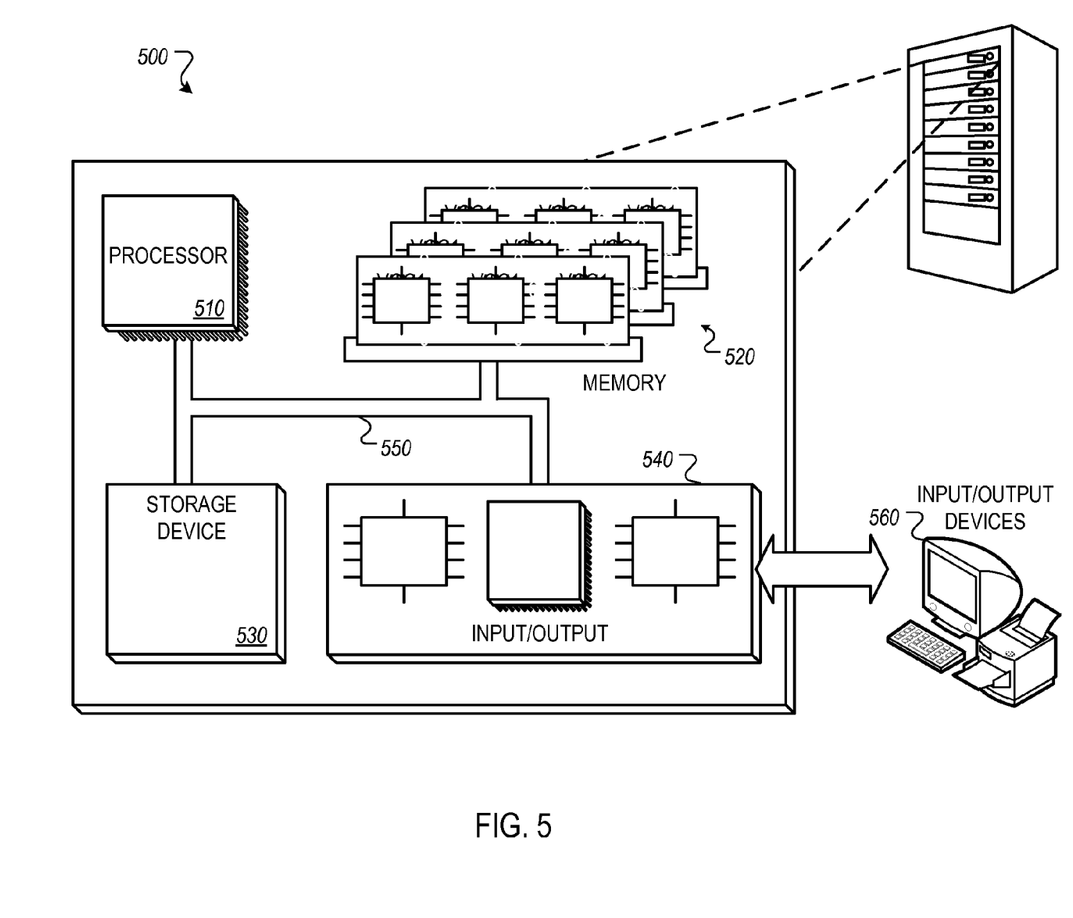
FIG. 5 is a schematic diagram of an example computer system that can be utilized to implement the systems and methods described herein.

FIG. 5 is block diagram of an example computer system 500. The system 500 includes a processor 510, a memory 520, a storage device 530, and an input/output device 540. Each of the components 510, 520, 530, and 540 can, for example, be interconnected using a system bus 550. The processor 510 is capable of processing instructions for execution within the system 500. In some implementations, the processor 510 is a single-threaded processor. In other implementations, the processor 510 is a multi-threaded processor. The processor 510 is capable of processing instructions stored in the memory 520 or on the storage device 530. The memory 520 stores information within the system 500. In some implementations, the memory 520 is a computer-readable medium. In other implementations, the memory 520 is a volatile memory unit. In yet other implementations, the memory 520 is a non-volatile memory unit.

The storage device 530 is capable of providing mass storage for the system 500. In some implementations, the storage device 530 is a computer-readable medium. In various different implementations, the storage device 530 can, for example, include a hard disk device, an optical disk device, or some other large capacity storage device.

The input/output device 540 provides input/output operations for the system 500. In some implementations, the input/output device 540 includes one or more network interface devices, e.g., an Ethernet card, a serial communication device, e.g., and RS-232 port, and/or a wireless interface device, e.g., and 802.11 card. In other implementations the input/output device includes driver devices configured to receive input data and send output data to other input/output devices, e.g., keyboard, printer and display devices 560.

Queries can, for example, be received from client devices that can be implemented on computer systems similar to the computer systems in FIG. 1 or FIG. 5. Other implementations, however, can also be used, such as mobile computing devices, mobile communication devices, set-top box television client devices, etc.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal that is generated to encode information for transmission to suitable receiver apparatus for execution by a computer. The computer-readable medium is a machine-readable storage device, a machine-readable storage substrate, a memory device, a composition of matter affecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. In some implementations, the steps in FIG. 3 can be executed as a batch process it can be done in a real-time manner, namely the collection of logs can be done in real time and weights associated with DOM nodes can be update in real time.

What is claimed is:

1. A method implemented by a data processing apparatus, the method comprising:
generating a document object model that represents a common format of documents in a collection of documents, where the document object model defines a structure of document parts corresponding to the format, wherein the document object model includes a plurality of nodes;
obtaining data associated with queries for which one or more of the documents were identified as being responsive, wherein each query includes one or more search terms;
selecting document parts of the identified documents containing one or more of the search terms;
associating a respective weight with one or more nodes of the document object model based on a count of search terms contained in the parts of the identified documents that correspond to the nodes of the document object model;
determining a first weights for each part of one or more parts of a first document, each first weight being derived from a weight associated with a node of the document object model corresponding to the part; and
providing the determined first weights corresponding to parts of the first document to a ranking process for ranking the first document in a plurality of documents.

2. The method of claim 1, wherein the data associated with the queries comprises information regarding impressions for one or more of the identified documents, in which an impression represents a prior user selection of an identified document.

3. The method of claim 2, wherein associating a respective weight with one or more nodes of the document object model further comprises:
increasing a weight associated with a first node of the plurality of nodes if the first node represents one or more document parts that include the search terms.

4. The method of claim 3, further comprising:
increasing the weight associated with the first node if the first node represents one or more document parts associated with an impression.

5. The method of claim 4, further comprising:
analyzing a user activity log to determine a number of impressions associated with each part of the documents.

6. A system comprising:
one or more data processing apparatus configured to perform operations comprising:
generating a document object model that represents a common format of documents in a collection of documents, where the document object model defines a structure of similar document parts in the collection of documents, wherein the document object model includes a plurality of nodes;
obtaining data associated with queries for which one or more of the documents were identified as being responsive, wherein each query includes one or more search terms;
selecting document parts of the identified documents containing one or more of the search terms;
associating a respective weight with one or more nodes of the document object model based on a count of search terms contained in the parts of the identified documents that correspond to the nodes of the document object model;
determining a first weight for each part of one or more parts of a first document, each first weight being derived from a weight associated with a node of the document object model corresponding to the part; and
providing the determined first weights corresponding to parts of the first document to a ranking process for ranking the first document in a plurality of documents.

7. The system of claim 6, wherein the data associated with the queries comprises information regarding impressions for one or more of the identified documents, in which an impression represents a prior user selection of an identified document.

8. The system of claim 7, wherein associating a respective weight with one or more nodes of the document object model further comprises:
increasing a weight associated with a first node of the plurality of nodes if the first node represents one or more document parts that include the search terms.

9. The system of claim 8, the operations further comprising:
increasing the weight associated with the first node if the first node represents one or more document parts associated with an impression.

10. The system of claim 9, the operations further comprising:
analyzing a user activity log to determine a number of impressions associated with each part of the documents.

11. A computer-readable storage device having stored thereon instructions, which, when executed by data processing apparatus, cause the data processing apparatus to perform operations comprising:
generating a document object model that represents a common format of documents in a collection of documents, where the document object model defines a structure of document parts corresponding to the format, wherein the document object model includes a plurality of nodes;
obtaining data associated with queries for which one or more of the documents were identified as being responsive, wherein each query includes one or more search terms;
selecting document parts of the identified documents containing one or more of the search terms;
associating a respective weight with one or more nodes of the document object model based on a count of search terms contained in the parts of the identified documents that correspond to the nodes of the document object model;
determining a first weights for each part of one or more parts of a first document, each first weight being derived from a weight associated with a node of the document object model corresponding to the part; and
providing the determined first weights corresponding to parts of the first document to a ranking process for ranking the first document in a plurality of documents.

12. The computer-readable storage device of claim 11, wherein the data associated with the queries comprises information regarding impressions for one or more of the identified documents, in which an impression represents a prior user selection of an identified document.

13. The computer-readable storage device of claim 12, wherein associating a respective weight with one or more nodes of the document object model further comprises:
increasing a weight associated with a first node of the plurality of nodes if the first node represents one or more document parts that include the search terms.

14. The computer-readable storage device of claim 13, the operations further comprising:
increasing the weight associated with the first node if the first node represents one or more document parts associated with an impression.

15. The computer-readable storage device of claim 14, the operations further comprising:
analyzing a user activity log to determine a number of impressions associated with each part of the documents.

* * * * *

UNITED STATES PATENT AND TRADEMARK OFFICE
CERTIFICATE OF CORRECTION

Page 1 of 1

PATENT NO. : 8,538,989 B1
APPLICATION NO. : 12/028382
DATED : September 17, 2013
INVENTOR(S) : Mayur Dhondu Datar, Kedar Dhamdhere and Ashutosh Garg It is certified that error appears in the above-identified patent and that said Letters Patent is hereby corrected as shown below:

In the Claims

Column 16, line 29, Claim 11: delete "weights" and insert -- weight --, therefor.

Signed and Sealed this
Fourth Day of February, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,538,989 B1 | Page 1 of 1 |
| APPLICATION NO. | : 12/028382 | |
| DATED | : September 17, 2013 | |
| INVENTOR(S) | : Datar et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1085 days.

Signed and Sealed this
Nineteenth Day of May, 2015

Michelle K. Lee
*Director of the United States Patent and Trademark Office*